Nov. 27, 1962 L. J. DELSA 3,065,768
INSULATION SPACED FROM PIPE BY SUPPORTS
Filed Aug. 19, 1959 2 Sheets-Sheet 1
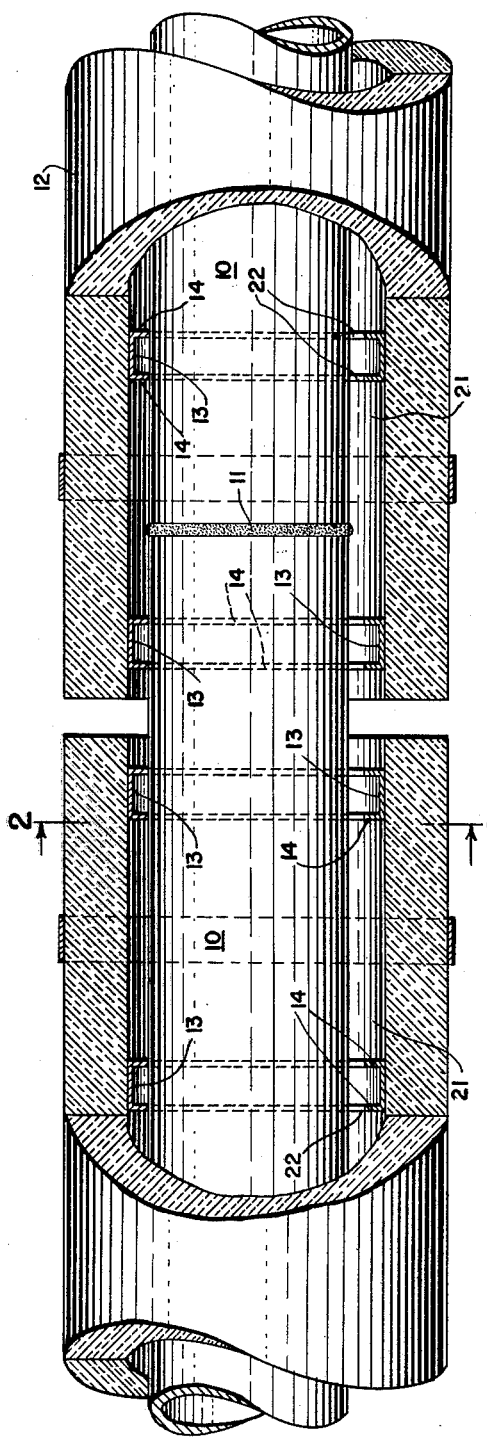
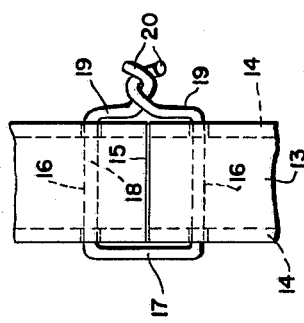
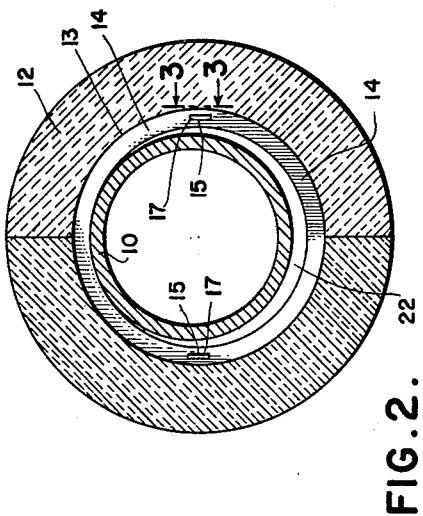
INVENTOR
Lawrence J. Delsa
BY Wilkinson, Mawhinney & Thiebault
ATTORNEYS Nov. 27, 1962 L. J. DELSA 3,065,768
INSULATION SPACED FROM PIPE BY SUPPORTS
Filed Aug. 19, 1959 2 Sheets-Sheet 2
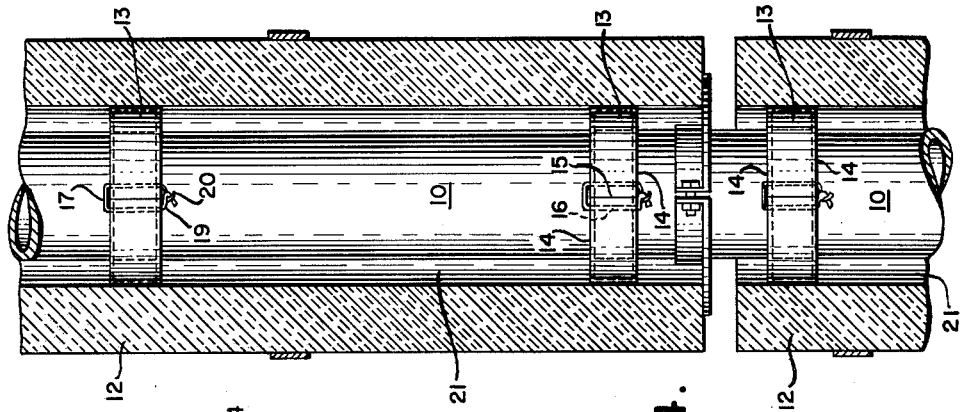
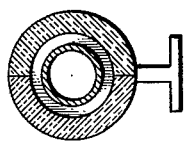
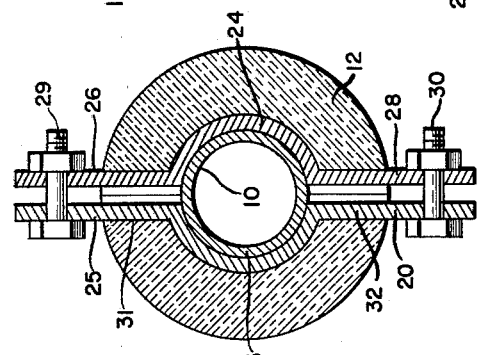
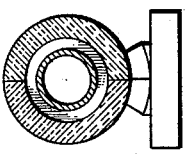
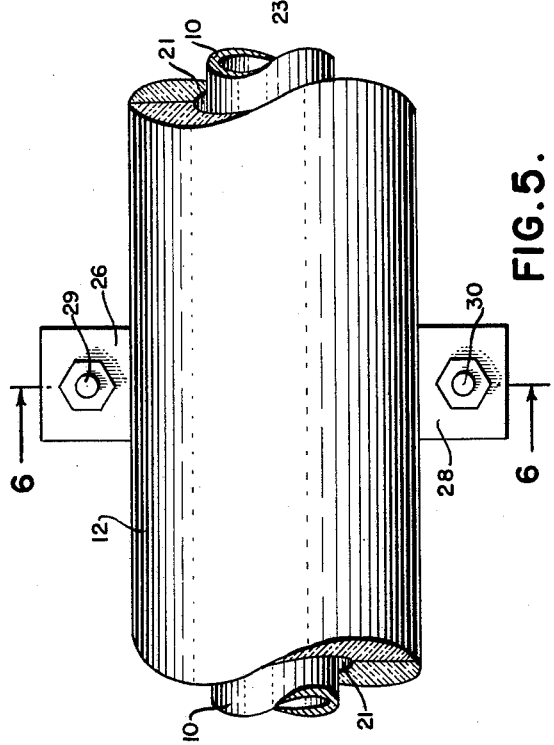
INVENTOR
Lawrence J. Delsa
ATTORNEYS United States Patent Office 3,065,768
Patented Nov. 27, 1962

3,065,768
INSULATION SPACED FROM PIPE BY SUPPORTS
Lawrence J. Delsa, New Orleans, La.
Filed Aug. 19, 1959, Ser. No. 834,779
3 Claims. (Cl. 138—148)

The present invention relates to insulation spaced from pipe by supports and has for an object to provide an insulation support for pipe which is subject to expansion and contraction to permit of the free expansion of the pipe without interference from the insulation or its support and without disrupting the insulation or its support.

Another object of the invention is to provide in connection with forms of asbestos or other solid insulation covering material devices for supporting such insulation covering in spaced relation from the pipe so as to provide in addition to the solid insulation, dead-air space insulation.

It is a further object of the invention to provide an improved pipe insulation and support therefor of a simple and economical character providing a succession of dead-air cells between the supporting members with communication between the cells provided by such members.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 1 is a fragmentary side elevational view, partly broken away and partly shown in section, of a form of insulation and support according to the present invention as applied to sections of steam or other pipes.

FIGURE 2 is a cross-sectional view taken on the line 2—2 in FIGURE 1.

FIGURE 3 is a fragmentary external plan view taken on an enlarged scale on the line 3—3 of FIGURE 2 and showing one form of device for coupling the sections of the supporting members together.

FIGURE 4 is a view similar to FIGURE 1 but with an application to a vertical height.

FIGURE 5 is a side elevational view of a pipe and covering with a form of hanger support.

FIGURE 6 is a cross-section taken on the line 6—6 of FIGURE 5.

FIGURES 7 and 8 show forms of shoes.

Referring more particularly to the drawings, 10 designates pipe sections of a steam pipe or other pipe subject to radial expansion and contraction and 11 represents a weld between adjacent sections 10.

A solid form of insulation covering is designated at 12, the same being in the form of semicircular sections fitted together about the pipe 10. The innovation here is that the internal diameter of the solid insulation body 12 is substantially larger than the outside diameter of the pipe 10 and the insulation is internally fitted with supporting members at suitably spaced intervals for supporting such insulation from the pipe 10 but in spaced relation thereto.

A form of such supporting member comprises a ring web 13 having internally directed flanges 14 at opposite ends thereof so that the flanges are spaced apart. These supporting members are preferably in semi-circular sections as indicated in FIGURE 2, the meeting edges of the sections being represented at 15.

As shown in FIGURES 2 and 3 adjacent such meeting edges 15, holes 16 are made through the flanges 14 to receive wire staples 17. These staples have legs 18 extending through the holes 16 of adjacent supporting ring members. The ends of the staples are represented at 19 as being bent over substantially at right angles to the legs 18 and the terminal ends of the staples are twisted together as indicated at 20 to hold the two sections of the members together about the pipe 10.

The internal diameter of the flanges 14 is also somewhat in excess of the pipe sections 10 so that the flanges of the supporting members rest at their upper portions upon the pipe 10 but at their lower and side portions they provide between the same and the pipe 10 communication passages 22 between the dead-air spaces 21 which are defined by the adjacent supporting members.

Referring more particularly to FIGURES 5 and 6 a form of hanger is shown as comprising two clamp sections 23 and 24 having pairs of shanks 25, 26 and 27, 28 extending radially out in opposite directions from the pipe 10 to which the intermediate rounded portions 23, 24 are applied. Bolts 29, 30 may be employed for holding the clamp sections about the pipe 10. It will be noted from FIGURE 6 that the insulation 12 is snugly fitted about the clamp intermediate sections 23, 24 and also about the shanks 25, 26 and 27, 28, suitably sized openings 31 and 32 being made in the insulation to receive the shanks 27, 28.

FIGURES 7 and 8 illustrate conventional forms of shoes and it will be understood that the insulation is fitted tightly about the same in the manner of FIGURE 6.

The ring members may be made from mild steel material of suitable gauge. A satisfactory dimension is 1" x ⅜" x ⅛". The outside diameter of these ring members is made to fit snugly on all sizes of pipe covering insulations, as shown in FIGURES 1 and 2. It is recommended that the ring supporting member be placed approximately nine inches apart if pipe covering joints are 18" broken joints or twelve inches apart if pipe covering joints are 12" and 24" broken joints. These ring supports should also preferably be placed at least two inches away from a weld 11 as illustrated in FIGURE 1.

For installation of pipe covering over rings on horizontal pipe, as shown in FIGURES 1 and 2, rings should be placed around pipe and wired together, pipe covering placed over these rings and banding is recommended to hold pipe covering of 4" size and over. Tie wire may be used on covering under 4" size. Pipe covering should be made to fit snugly around hangers, shoes or any pipe support as illustrated in FIGURE 6 and should have a 1" opening in the pipe covering as shown in this FIGURE 1. These openings should be made between hangers or pipe supports and at a T, valve, 90° or 45° bends. An opening should be made on each side of the fittings. Also the insulation on the fittings mentioned should be built to a thickness to equal the outside diameter of pipe covering over rings. In so doing a covering can be put over the opening acting in the capacity of an expansion joint.

For installation of pipe covering over rings on vertical pipe as shown in FIGURE 4, the foregoing instructions with respect to horizontal pipe may be followed with the exception of the opening for expansion joints. At the starting of a vertical run, a supporting ring should be attached to the pipe to support the weight of insulation. Thereupon proceed from here and apply additional rings and pipe covering. The opening for expansion to take place should be made at the bottom of every hanger, support or valve, etc.

For installation of pipe covering over rings on long radius bends, a ring should be placed in each segment and joints should be broken at least every one and one-half inch. In this way bends can be applied to hold segments firmly together. It is also recommended that a fireproof adhesive be used between each segment and an opening or expansion joint should be made at each end of long radius bends.

The advantages of the invention are readily apparent to those skilled in the art. For instance the use of the invention will provide the following advantages:

Stops heat loss where insulation joints leak and cracks open;

Stops opening of pipe covering at sectional joints;

Stops cracking and breaking of pipe covering between joints;

Air space between insulation and pipe accounts for better insulation value (the radius of this space has been found satisfactory where the same is of the order of one-half inch);

Saves on thickness of insulation due to air space;

Insulation on high temperature steam pipes that require two thicknesses of insulation require only one thickness;

Maintenance of insulation at lower cost;

Better appearance of insulation after steam has been on and off several times;

Manufacturers are not required to change standard sizes of pipe cover (for example, 4" pipe calls for 5" pipe insulation, 5" pipe calls for 6" pipe insulation, etc.);

The rings are inexpensive to manufacture.

Although I have disclosed herein the best form of the invention known to me at this time, I reserve the right to all such modifications and changes as may come within the scope of the following claims.

What is claimed is:

1. For use with a rigid pipe subject to high temperature and radial and axial expansion and contraction,
   (a) a substantially inexpansible insulation covering of tubular form having an inside diameter substantially greater than the external diameter of the pipe fitted about the pipe,
   (b) supports fitted internal of the covering at spaced intervals along the axis thereof and comprising
   (c) outer portions having smooth external surfaces for snug fitting with the covering and
   (d) inner portions extending radially from the outer portions in axially spaced relation and having free narrow inner edges defining openings adapted to be received over the pipe,
   (e) said openings having diameters greater than the external diameter of the pipe whereby the edges of the flanges
   (f) rest on the pipe only at the upper portions of the pipe to support the insulation covering from the pipe and to provide
   (g) communication passages between the lower portions of the pipe and the flange edges to establish axial communication between the dead air spaces defined between the pipe, covering and adjacent supports,
   (h) said passages permitting free thermal radial and axial expansion of the pipe without communicating like expansion and disruptive thrusts through the supports to the covering.

2. For use with a rigid pipe subject to high temperature and radial and axial expansion and contraction,
   (a) a substantially inexpansible insulation covering of tubular form having an inside diameter substantially greater than the external diameter of the pipe fitted about the pipe,
   (b) supports fitted internal of the covering at spaced intervals along the axis thereof and comprising
   (c) outer substantially narrow ring webs and
   (d) axially spaced flanges extending radially inward from the webs and having free inner edges defining openings adapted to be received over the pipe,
   (e) said openings having diameters greater than the external diameter of the pipe whereby the edges of the flanges
   (f) rest on the pipe only at upper portions of the pipe to support the insulation covering from the pipe and to provide
   (g) communication passages between the dead air spaces defined between the pipe, covering and adjacent supports,
   (h) said passages permitting free thermal radial and axial expansion of the pipe without communicating like expansion and disruptive thrusts through the supports to the covering.

3. A device as claimed in claim 2 in which
   (i) said ring webs having outer smooth surfaces capable of being snugly fitted to the internal cylindrical wall of the covering and
   (j) the flanges extending at substantially right angles to the webs with the edges thereof narrow axially to provide a minimum of contact with the heated pipe.

References Cited in the file of this patent

UNITED STATES PATENTS

| 1,111,688 | Bonitz | Sept. 22, 1914 |
| 1,276,752 | Goodall | Aug. 27, 1918 |
| 1,419,171 | Read | June 13, 1922 |
| 2,275,902 | Hasenburger et al. | Mar. 10, 1942 |
| 2,512,116 | Siebels | June 20, 1950 |
| 2,531,658 | Walsh | Nov. 28, 1950 |
| 2,795,108 | Saldin | June 11, 1957 |
| 2,896,669 | Broadwaw et al. | July 28, 1959 |

FOREIGN PATENTS

| 352,616 | Germany | Apr. 28, 1922 |